United States Patent [19]
Johnson

[11] Patent Number: 5,870,974
[45] Date of Patent: Feb. 16, 1999

[54] ANIMAL ANCHOR

[76] Inventor: Keith Johnson, 1975 LaSalle St., Ottawa, Ill. 61350

[21] Appl. No.: 963,889

[22] Filed: Nov. 4, 1997

Related U.S. Application Data

[60] Provisional application No. 60/030,775 Nov. 13, 1996.
[51] Int. Cl.[6] .................................................. A01K 3/00
[52] U.S. Cl. ............................................ 119/786; 119/791
[58] Field of Search ................................. 119/756, 758, 119/769, 786, 787, 788, 780, 791

[56] References Cited

U.S. PATENT DOCUMENTS

| 704,730 | 7/1902 | Zierleyn | 119/769 |
| 753,835 | 3/1904 | Albee | 119/769 |
| 800,260 | 9/1905 | Bellstedt | 119/769 |
| 843,543 | 2/1907 | Matsumoto | 119/769 |
| 5,165,365 | 11/1992 | Thompson | 119/786 |

*Primary Examiner*—Robert P. Swiatek
*Assistant Examiner*—James S. Bergin
*Attorney, Agent, or Firm*—Lee, Mann, Smith, McWilliams, Sweeney and Ohlson

[57] ABSTRACT

The animal anchor disclosed has a substantially horizontally extending body member which includes a central hub portion, an annular outer portion surrounding the hub portion, and spoke portions interconnecting the central hub and annular outer portions. The hub has a swivel hook for connecting a leash or chain. A majority of the weight of the body member is disposed in the annular outer portions making the anchor difficult to tip.

6 Claims, 1 Drawing Sheet

ANIMAL ANCHOR

This application is based upon and claims the priority of U.S. provisional application serial No. 60/030,775 filed Nov. 13, 1996.

BACKGROUND OF THE INVENTION

This invention relates to an animal anchor, and more particularly to an anchor which serves as a tie-off for dogs and other small animals.

There has long been a need for a reliable and convenient tie-off for dogs and other small animals. Conventional tie-offs require the fastening of the tie-off to the ground using a stake which is driven or screwed into the ground. Devices of this kind are found in the prior art U.S. Pat. No. 2,087,176; No. 2,435,081; and No. 2,525,890. These three patented devices have a swivel connection at the top so the animal can move in a circle without tangling, but all of them feature a stake which is driven into the ground in order to anchor the device.

Other prior art methods of animal tie-offs include cables or ropes around trees or posts, which may result in tangling, or tie-offs which are moveable along a cable strung between trees or posts.

It is an object of this invention to provide an animal anchor which is a moveable, self-contained unit that is free from tangling, does not require a driven stake or screw anchor and is attractive and virtually indestructible, providing years of use.

It is another object of this invention to provide an animal anchor which is very easy on, i.e., almost totally non-destructive of, the grass and may be easily moved from one location to another so that there is less tendency to wear a track in the grass.

SUMMARY OF THE INVENTION

An animal anchor is provided which comprises a substantially horizontally extending body member including a central hub portion having a vertical axis. A peripheral outer portion is spaced outwardly from and surrounding the central hub portion, and a connection portion preferably in the form of spokes or arms extends outwardly from said hub portion and connects the hub portion to the surrounding peripheral portion. The majority of the weight of the body member is disposed outwardly of the hub portion and a connector is mounted for free horizontal rotation about the vertical axis of the body member hub portion, the connector having a formation adjacent its outer end to which a leash or animal lead may be connected.

DETAILED DESCRIPTION OF THE PREFERRED EMBODIMENT

Figure 1:
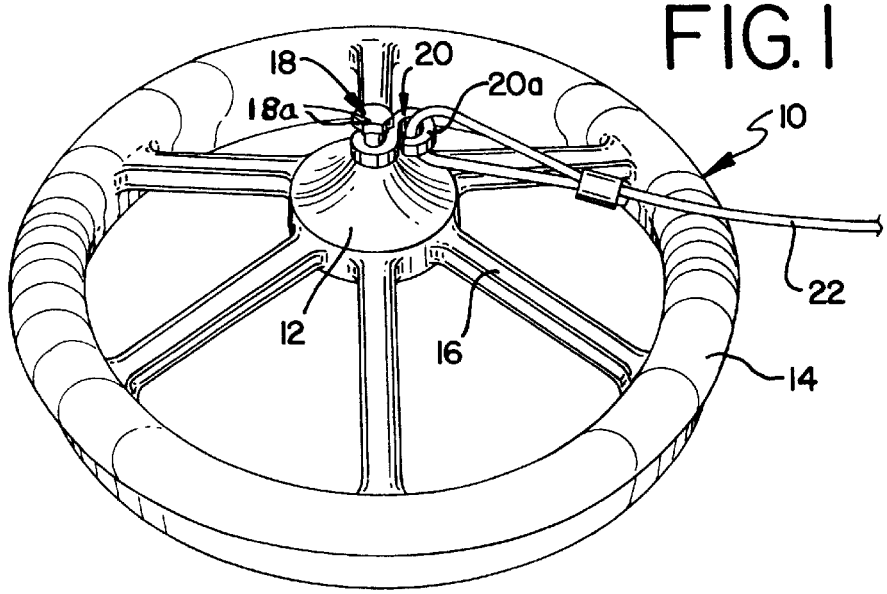
FIG. 1 is a perspective view of an animal anchor constructed in accordance with this invention.

With reference to the drawing, the animal anchor constructed in accordance with this invention has a substantially horizontally extending body member 10 which includes a central hub portion 12 having a vertical axis, a peripheral outer portion 14 spaced outwardly from and surrounding the central hub portion 12 and a connecting portion 16 preferably in the form of spokes or arms which are equally spaced about and extend radially outward from the hub to connect the hub 12 to the peripheral outer portion 14.

Figure 2:
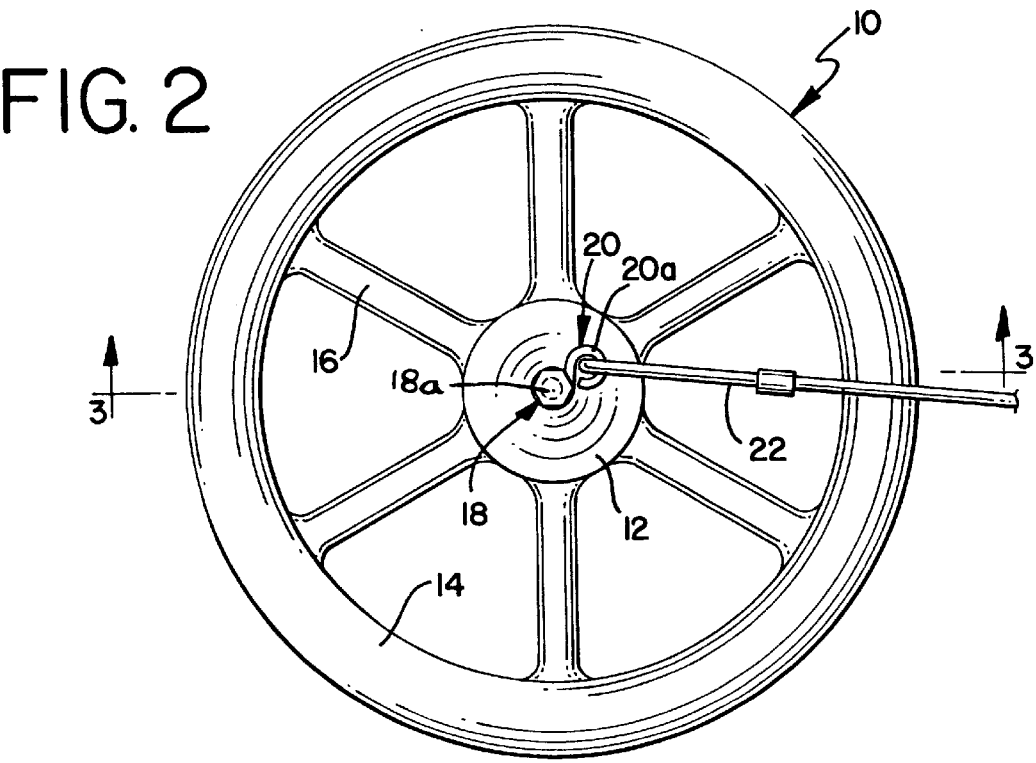
FIG. 2 is a plan view of the animal anchor.
Figure 3:
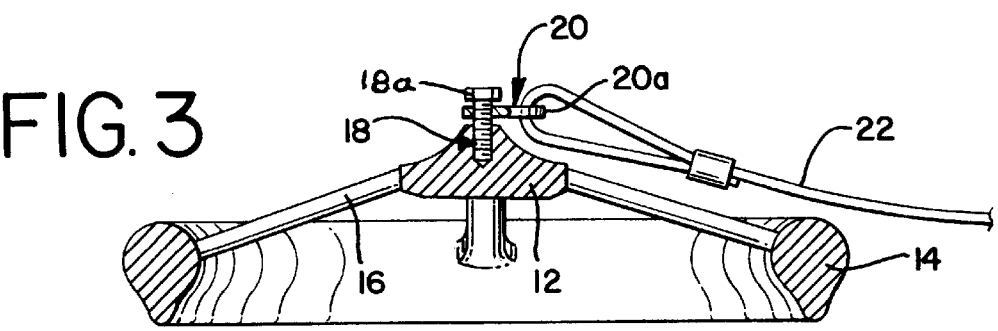
FIG. 3 is a sectional elevational view taken substantially along the lines of 3—3 of FIG. 2.

The central hub portion 12, the peripheral outer portion 14 and connecting portion 16 are preferably integrally formed of cast iron or other heavy metal, although these parts could be formed of a heavy nonmetallic material, such as, for example, concrete. It is preferred that the bulk of the weight of the body member 10 be in the peripheral outer portion 14 and that the entire body member have a very low vertical profile. The spokes or arms of the connecting portion 16 are preferably relatively thin compared to the peripheral outer portion 14. This is shown in FIGS. 2 and 3. Although the hub portion 12 is shown as extending slightly above the upper extension of the peripheral outer portion 14, it is not necessary that the hub extend above the other portions of the animal anchor body member. Indeed, there are advantages in keeping the central hub as low to the ground as possible.

Threaded into the central axis of the hub portion 12, is a bolt 18 having an enlarged head portion 18a. Around the upper portion of this bolt between the top of the hub portion 12 and the head 18 of the bolt is connector 20 preferably in the form of a closed end S-hook although this connector can be in a number of different configurations as will readily be apparent to those skilled in the art. The connector 20 is mounted for free horizontal rotation about the vertical axis of the bolt 18 which is also the vertical axis of the hub portion 12. The connector has a formation such as an eye or S-hook formation 20a adjacent its outer end to which a leash or dog lead 22 may be connected.

The animal anchor may come in various sizes depending upon the size of the animal to be restrained. In the illustrated embodiment the anchor is in the shape of a wheel with the peripheral outer portion 14 being in the shape of a circular annulus. While this is the preferred configuration and facilitates the movement of the anchor such as by rolling, the peripheral annular outer portion 14 could actually be in a polygonal shape such as for example, a square, pentagon or octagon. The term "annulus" is intended to incorporate all such ring-like shapes. It has been found, however, that the circular shape of the outer body portion has the additional advantage of being less easy to pull over than an anchor with a polygonally shaped peripheral outer body portion 14. It is also preferred that the peripheral outer portion 14 have a substantially inverted tear-shaped cross-section as may be seen in FIG. 3. This provides a very small foot print for the anchor and does less damage to grass, for example. An alternative design could be a T-shaped cross section which would also provide a small foot print although the outer body portion could have a round or even polygonally shaped cross section.

While the connector is shown as a closed end S-hook, the connector could be an eye bolt, for example, or any of the connectors shown in U.S. Pat. No. 2,087,176; No. 2,435,081 or No. 2,525,890, or any number of different configurations which will be readily apparent to those skilled in the art.

An important aspect of the invention is the low vertical profile of the anchor, with the bulk of the weight on the outside and preferably in the peripheral outer portion 14. For example, in a 45 pound cast iron animal anchor, the peripheral outer portion 14 will have an outer diameter of 17⅜ inches and a height of 2½ inches. The hub portion 12, which is preferably approximately at the center of gravity of the anchor, may extend an 1¾ inches above the top of the outer portion 14, or it may be in the same plane as the peripheral outer portion. The thin spokes of connecting portion 16 may each be an inch in diameter. The low vertical profile makes it very difficult for an animal to tip the anchor over since the force applied horizontally to the bolt 18 will be at or just slightly above the plane of the center of gravity of the anchor. Even if the animal is strong enough to move the anchor the anchor would not tip over, but rather would drag along the ground for a short distance. The 45 pound model of the anchor has been found effective on dogs up to 50 pounds and a 65 pound anchor is quite effective on larger dogs and other animals. The 65 pound anchor may, for example, have a peripheral outer portion 14 with a diameter of 19⅝ inches and a height of the outer portion of 3 inches. In that model the connector 20 is attached to the hub portion 12 (or the bolt 18 forming an upward extension of the hub portion). The connection would be approximately 5¼ inches above the bottom of the anchor, although again this could even be lower if desired. Spokes or arms are preferred so that the bulk of the weight will be in the outer portion 14 of the anchor and not in the area of the spokes.

As may be seen from this example, the connector 20 is preferably located at a height of less than twice the height of the peripheral outer portion 14 and is at a height above the ground of no more than ⅓ of the diameter of this peripheral outer portion 14.

The foregoing has been given only by way of example and various modifications may be made as would be readily apparent to those skilled in the art.

What is claimed is:

1. An animal anchor comprising a substantially horizontally extending body member including a central hub portion having a vertical axis, a peripheral outer portion spaced outwardly from and surrounding said central hub portion, and a connecting portion consisting of a plurality of spokes extending outwardly from said hub portion and connecting said hub portion to said surrounding peripheral portion, said connecting portion being affixed to and immovable with respect to said hub and peripheral portions, a majority of the weight of said body member being disposed outwardly of said hub portion, and a connector attached to said hub portion for free horizontal rotation about the vertical axis of said hub portion, said connector at the point of attachment to said hub portion being located at a height above the ground of no more than about ⅓ the outer diameter of said peripheral portion and having a formation adjacent its outer end to which a leash may be connected.

2. The structure of claim 1 wherein said peripheral portion is substantially circular.

3. The structure of claim 1 wherein said hub portion is approximately at the center of gravity of the anchor.

4. The structure of claim 1 wherein said connector is located at a height of less than twice the height of said peripheral portion.

5. An animal anchor comprising a substantially horizontally extending body member including a central hub portion having a vertical axis, a peripheral outer portion spaced outwardly from and surrounding said central hub portion, and a connecting portion consisting of a plurality of spokes extending outwardly from said hub portion and connecting said hub portion to said surrounding peripheral portion, said connecting portion being affixed to and immovable with respect to said hub and peripheral portions, a majority of the weight of said body member being disposed outwardly of said hub portion, and a connector attached to said hub portion for free horizontal rotation about the vertical axis of said hub portion, said connector at the point of attachment to said hub portion being located at a height above the ground of no more than about ⅓ the outer diameter of said peripheral portion and having a formation adjacent its outer end to which a leash may be connected, said peripheral portion having a substantially tear-shaped section, whereby the portion of said animal anchor in contact with the ground will have a small footprint.

6. The animal anchor of claim 5 wherein said peripheral, hub and connecting portions of said body member are integral.

\* \* \* \* \*